US011901797B2

United States Patent
Lee et al.

(10) Patent No.: US 11,901,797 B2
(45) Date of Patent: Feb. 13, 2024

(54) CLEANER WITH CLUTCH FOR MOTOR ENGAGEMENT

(71) Applicant: LG ELECTRONICS INC., Seoul (KR)

(72) Inventors: Seungjin Lee, Seoul (KR); Sangjo Kim, Seoul (KR); Sangik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 798 days.

(21) Appl. No.: 16/971,461

(22) PCT Filed: Feb. 20, 2019

(86) PCT No.: PCT/KR2019/002069
§ 371 (c)(1),
(2) Date: Aug. 20, 2020

(87) PCT Pub. No.: WO2019/164262
PCT Pub. Date: Aug. 29, 2019

(65) Prior Publication Data
US 2020/0395815 A1    Dec. 17, 2020

(30) Foreign Application Priority Data

Feb. 20, 2018    (KR) .......................... 10-2018-0019887

(51) Int. Cl.
*H02K 7/10*    (2006.01)
*A47L 9/28*    (2006.01)
(Continued)

(52) U.S. Cl.
CPC .............. *H02K 7/1008* (2013.01); *A47L 9/22* (2013.01); *A47L 9/2852* (2013.01); *H02K 7/108* (2013.01); *A47L 2201/04* (2013.01)

(58) Field of Classification Search
CPC ..... A47L 9/0444; H02K 7/1008; H02K 7/108
See application file for complete search history.

(56) References Cited

U.S. PATENT DOCUMENTS

| 4,754,520 A | 7/1988 | Steadings et al. |
| 4,766,640 A | 8/1988 | Martin et al. |

(Continued)

FOREIGN PATENT DOCUMENTS

| JP | 2012-115614 A | 6/2012 |
| KR | 20-1993-0021004 | 10/1993 |

(Continued)

OTHER PUBLICATIONS

European Search Report, dated Oct. 20, 2021, issued in European Patent Application No. 19757877.6 (5 pages).

(Continued)

*Primary Examiner* — Charles A Fox
*Assistant Examiner* — Gregory T Prather
(74) *Attorney, Agent, or Firm* — Birch, Stewart, Kolasch & Birch, LLP

(57) ABSTRACT

A cleaner capable of adjusting tension of a belt to connect or disconnect power between a motor and a wheel in the cleaner including the belt transmitting a driving force of the motor to the wheel is provided. A cleaner according to the present disclosure includes a cleaner body, a wheel which movably supports the cleaner body with respect to a floor, a traveling drive motor which is disposed in the cleaner body, a first pulley which is rotated by a driving force of the traveling drive motor, a second pulley which is rotated when the first pulley rotates and rotates the wheel, a belt which connects the first pulley and the second pulley, and a clutch which adjusts tension of the belt to connect or disconnect power between the first pulley and the second pulley.

22 Claims, 7 Drawing Sheets

(51) Int. Cl.
*A47L 9/22* (2006.01)
*H02K 7/108* (2006.01)

(56) References Cited

U.S. PATENT DOCUMENTS

| | | | | |
|---|---|---|---|---|
| 4,900,295 | A | * 2/1990 | Tani | F16G 5/06 |
| | | | | 474/167 |
| 5,974,622 | A | 11/1999 | Louis et al. | |
| 2002/0174507 | A1 | * 11/2002 | Kasper | A47L 11/4088 |
| | | | | 15/340.2 |
| 2008/0271285 | A1 | * 11/2008 | Maurer | A47L 9/2863 |
| | | | | 15/389 |
| 2013/0055526 | A1 | * 3/2013 | Tran | A47L 5/12 |
| | | | | 15/383 |

FOREIGN PATENT DOCUMENTS

| | | |
|---|---|---|
| KR | 10-0572156 | 4/2006 |
| KR | 10-0681495 | 2/2007 |
| KR | 10-1684159 | 12/2016 |

OTHER PUBLICATIONS

PCT Search Report, dated Jun. 24, 2019, issued in PCT International Patent Application No. PCT/KR2019/002069 (3 pages).

\* cited by examiner

CLEANER WITH CLUTCH FOR MOTOR ENGAGEMENT

TECHNICAL FIELD

The present disclosure relates to a cleaner, and more particularly, to a cleaner capable of performing automatic cleaning and manual cleaning.

BACKGROUND

In general, a cleaner includes a cleaner body having a suction device and a dust container, and a cleaning nozzle connected to the cleaner body to perform cleaning in a state close to a surface to be cleaned.

The cleaner is divided into a manual cleaner in which a user directly cleans a cleaning target surface in a manual manner, and an automatic cleaner in which a cleaner body cleans the cleaning target surface while the cleaner body runs by itself.

In the manual cleaner, when a user places a cleaning nozzle on the cleaning target surface in a state of holding the cleaning nozzle or the cleaner body by a hand of the user in a state where the suction device generates a suction force by a driving force of an electric motor, the cleaning nozzle sucks foreign substances such as dust on the cleaning target surface by the suction force, the sucked foreign substances are collected by the dust container, and thus, the cleaning target surface is cleaned.

Moreover, in the automatic cleaner, an ultrasonic sensor and/or a camera sensor is further provided in a cleaner body included in the suction device and the dust container, the cleaning nozzle sucks foreign substances on a cleaning target surface by a suction force generated by the suction device while the cleaner body automatically travels around the cleaning target surface, the sucked foreign substances are collected by the dust container, and thus, the cleaning target surface is cleaned.

The cleaning nozzle used in the manual cleaner is moved to the cleaning target surface by the user and comes into close contact with the cleaning target surface. However, the cleaning nozzle used in the automatic cleaner is disposed to come into close contact with the cleaning target surface when the cleaning nozzle is coupled to the cleaner body.

A wheel for traveling the cleaner body is installed in the cleaner body of each of the manual cleaner and the automatic cleaner. The wheel installed in the manual cleaner allows the user to easily drag the cleaner body in a state of placing the cleaner body on a floor during cleaning, and the wheel installed in the automatic cleaner automatically travels the cleaner body while being rotated by the driving force of the electric motor.

In recent years, a cleaner capable of performing both the automatic cleaning and the manual cleaning has been developed actively. However, the cleaner capable of performing both the automatic cleaning and the manual cleaning is disposed in a state in which the rotating shaft and the wheel of the electric motor are connected to each other in order to perform the automatic cleaning. Therefore, in the case of the manual cleaning, there is a problem in that the wheel is not easily rotated due to a load of the rotating shaft of the electric motor even if the user drags the cleaner body.

Therefore, in the cleaner capable of performing both the automatic cleaning and the manual cleaning, it is necessary to connect the rotating shaft of the electric motor and the wheel to each other in an automatic cleaning mode, and disconnect the rotating shaft of the electric motor and the wheel from each other in a manual cleaning mode.

In this regard, Korea Patent No. 10-1684159 (published on Dec. 7, 2016) discloses a vacuum cleaner including a clutch mechanism which connects a motor and a wheel to each other or disconnects the motor and the wheel from each other according to an operation state of a cleaner body, in which the clutch mechanism includes a sun gear which is connected to the motor, a ring gear which is connected to the wheel, a plurality of stationary planetary gears which are disposed to be separated from each between the sun gear and the ring gear, and a movable planetary gear which transmits a rotating force transmitted to the sun gear to one gear of the plurality of stationary planetary gears.

However, all structures of the clutch mechanism for connecting power between the motor and the wheel are configured of gears. Accordingly, the configuration thereof is complicated, and weight and costs of the clutch mechanism increase.

Moreover, all structures of the clutch mechanism for connecting power between the motor and the wheel are configured of gears. Accordingly, a technology for connecting or disconnecting the power between the motor and the wheel when the power between the motor and the wheel is connected to each other by a belt was not considered in the Korean patent.

Technical Problem

An object of the present disclosure is to provide a cleaner capable of adjusting tension of a belt to connect or disconnect power between a motor and a wheel in the cleaner including the belt transmitting a driving force of the motor to the wheel.

Another object of the present disclosure is to provide a cleaner in which the belt is not separated from a pulley even when the tension of the belt is loosened to disconnect the power between the motor and the wheel.

An object of the preset disclosure is not limited to the above-described objects, and other objects which are not mentioned will be clearly understood by a person skilled in the art from the following description.

Technical Solution

In order to achieve the above-described objects, according to an aspect of the present disclosure, there is provided a cleaner including: a cleaner body; a wheel which movably supports the cleaner body with respect to a floor; a traveling drive motor which is disposed in the cleaner body; a first pulley which is rotated by a driving force of the traveling drive motor; a second pulley which is rotated when the first pulley rotates and rotates the wheel; a belt which connects the first pulley and the second pulley; and a clutch which adjusts tension of the belt to connect or disconnect power between the first pulley and the second pulley.

The clutch may connect the power between the first pulley and the second pulley in a preset autonomous traveling mode to perform autonomous traveling, and disconnect the power between the first pulley and the second pulley in a preset manual mode to perform manual movement.

The cleaner may further include a housing in which the first pulley and the second pulley are rotatably provided, and the clutch may include a base which is installed in the housing so as to be movable linearly, and a tension roller which is rotatably installed in the base and is in contact with the belt to adjust the tension of the belt.

The housing may include a rectangular hole and a first guide protrusion which is formed to be elongated in a linear movement direction of the base in an upper side and a lower side of the rectangular hole, and a guide groove into which the first guide protrusion is inserted may be formed on upper and lower surfaces of the base.

The housing may further include a second guide protrusion which protrudes in a direction orthogonal to a protrusion direction of the first guide protrusion and guides movements of the upper and lower surfaces of the base.

A hook which is locked to the housing at a position where the tension roller connects the power between the first pulley and the second pulley is formed to protrude in the base.

The hook is formed to protrude in a direction in which the base is linearly moved to connect the power between the first pulley and the second pulley.

The hook includes an upper hook which is formed in an upper portion on one side in the linear movement direction of the base, and a lower hook which is formed in a lower portion on one side in the linear movement direction of the base.

A hook protrusion may be formed in the hook, and a locking step to which the hook protrusion is locked may be formed in the housing.

The clutch may further include an elastic member which provides an elastic force for moving the base to an original position when the hook is unlocked from the housing.

The elastic member may be a coil spring, and a first insertion boss inserted into one end of the coil spring may be formed to protrude from the base, and a second insertion boss inserted into the other end of the coil spring may be formed to protrude from the housing.

The cleaner may further include at least one gear which is installed in the housing and is rotated by the driving force of the traveling drive motor to rotate the first pulley.

The at least one gear may include a first gear which is coupled to a rotating shaft of the traveling drive motor, a second gear which meshes with the first gear and is rotated in a direction opposite to a rotation direction of the first gear, a third gear which meshes with the second gear and is rotated in a direction opposite to the rotation direction of the second gear, and a fourth gear which meshes with the third gear, is rotated in a direction opposite to the rotation direction of the third gear, and is connected to the first pulley.

A separation prevention groove into which the belt is inserted may be formed on an outer peripheral surface of each of the first pulley and the second pulley, and the belt maintains a state of being inserted into the separation prevention groove when the clutch disconnects the power between the first pulley and the second pulley.

In the first pulley and the second pulley, a plurality of locking protrusion may be formed on a bottom surface of the separation prevention groove along a circumferential direction, and a plurality of locking grooves meshing with the plurality of locking protrusions may be formed on an inner peripheral surface of the belt.

Specific matters of other embodiments are included in the detail description and the drawings.

Advantageous Effects

According to the cleaner of the present disclosure, the clutch adjusts the tension of the belt while being linearly moved in the housing and thus, connects or disconnect the power between the first pulley and the second pulley. Accordingly, the user can connect the power between the traveling drive motor and the wheel when operating the cleaner in the automatic cleaning mode, and can disconnect the power between the traveling drive motor and the wheel when operating the cleaner in the manual cleaning mode.

In addition, the separation prevention groove into which the belt is inserted is formed on an outer peripheral surface of each of the first pulley and the second pulley. Accordingly, even when the tension of the belt is loosened to disconnect the power between the motor and the wheel, a state where the belt is inserted into the separation prevention groove is maintained, and thus, the belt is not separated from the first pulley and the second pulley.

An object of the preset disclosure is not limited to the above-described objects, and other objects which are not mentioned will be clearly understood by a person skilled in the art from the following description.

DETAILED DESCRIPTION

Figure 1:
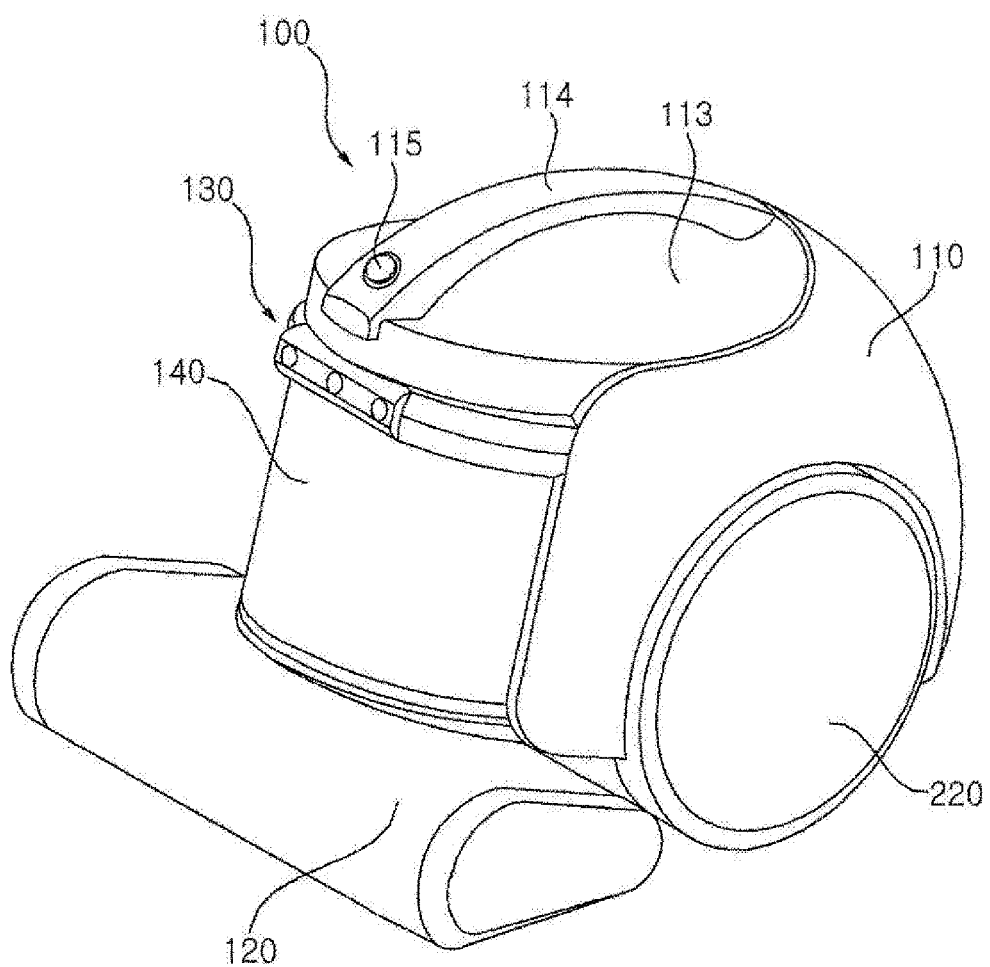
FIG. 1 is a perspective view illustrating a cleaner according to an embodiment of the present disclosure.

Hereinafter, Advantages and features of the present disclosure, and a method of achieving them will become apparent with reference to embodiments described below in detail with the accompanying drawings.

However, the present disclosure is not limited to the embodiments disclosed below, but may be implemented in various different forms. The present embodiment is provided to ensure that the disclosure of the present disclosure is complete and to fully inform a scope of the disclosure to a person with ordinary knowledge in a technical field to which the present disclosure belongs, and the present disclosure is defined by a scope of only claims. The same reference numerals refer to the same components throughout the specification.

Hereinafter, a cleaner according to an embodiment of the present disclosure will be described with reference to the drawings.

Figure 2:
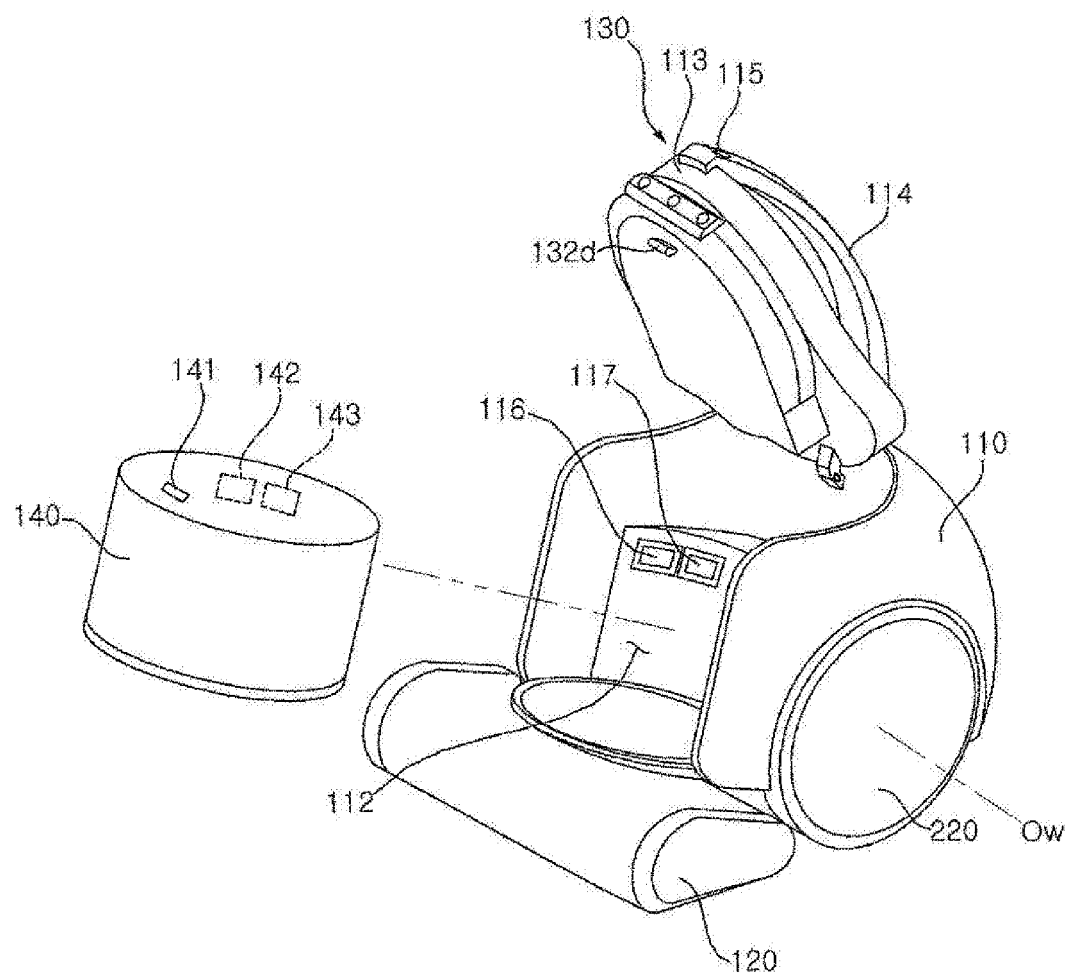
FIG. 2 is a view illustrating the cleaner in a state where a dust container is separated in FIG. 1.

FIG. 1 is a perspective view illustrating a cleaner according to an embodiment of the present disclosure, and FIG. 2 is a view illustrating the cleaner in a state where a dust container is separated in FIG. 1.

Referring to FIGS. 1 and 2, the cleaner 100 includes a cleaner body 110, a cleaning nozzle 120, a sensing unit 130, and a dust container 140.

Various parts including a controller (not illustrated) for controlling the cleaner 100 are embedded or mounted in the cleaner body 110. The cleaner body 110 may form a space in which various parts constituting the cleaner 100 are accommodated.

In the cleaner body 110, one of an automatic mode and a manual mode may be selected by a user so that the cleaner body 110 may be driven. The cleaner body 110 may include a mode selection input unit for selecting one of the automatic mode and the manual mode by the user. When the user selects the automatic mode in the mode selection input unit, the cleaner body 110 may automatically travel like a robot cleaner. In addition, when the user selects the manual mode in the mode selection input unit, the cleaner body 110 may be driven manually while being pulled or pushed by a force of the user.

The cleaner body 110 includes a wheel 220 for traveling the cleaner body 110. The wheel 220 may include a motor (not illustrated) and at least one wheel rotated by a driving force of the motor. A rotation direction of the motor may be controlled by the controller (not illustrated), and accordingly, the wheel of the wheel 220 may be configured to be rotatable in one direction or another direction.

The wheels 220 may be provided on both left and right sides of the cleaner body 110, respectively. The cleaner body 110 may be moved or rotated back and forth, right and left by the wheel 220.

Each wheel 220 may be configured to be driven independently of each other. To this end, each wheel 220 may be driven by a different motor.

The controller controls the driving of the wheel 200, and thus, the cleaner 100 can autonomously travel the floor.

The wheel 220 is provided in a lower portion of the cleaner body 110 and travels the cleaner body 110. The wheel 220 may be configured of only circular wheels, may be configured of circular rollers connected by a belt chain, or may be configured of a combination of circular wheels and circular rollers connected by a belt chain. An upper portion of the wheel of the wheel 220 may be disposed in the cleaner body 110, and a lower portion of the wheel 220 may protrude downward of the cleaner body 110. At least a lower portion of the wheel of the wheel 220 is provided to be in contact with a floor surface, and thus, the wheel can travel the clean body 110.

The wheels 220 may be installed on right and left sides of the cleaner body 110, respectively. The wheel 220 disposed on the left side of the cleaner body 110 and the wheel 220 disposed on the right side of the cleaner body 110 may be driven independently of each other. That is, the wheels 220 disposed on the left side of the cleaner body 110 may be connected to each other through at least one first gear, and may be rotated by a driving force of a first traveling motor which rotates the first gear. In addition, the wheels 220 disposed on the right side of the cleaner body 110 may be connected to each other through at least one second gear, and may be rotated by a driving force of a second traveling motor which rotates the second gear.

The controller may determine a traveling direction of the cleaner body 110 by controlling a rotational speed of the rotation shaft of each of the first traveling motor and the second traveling motor. For example, when the rotation shafts of the first traveling motor and the second traveling motor are simultaneously rotated at the same speed, the cleaner body 110 may go straight. In addition, when the controller simultaneously rotates the rotation shafts of the first traveling motor and the second traveling motor at different speeds, the cleaner body 110 may turns right or left. The controller may drive one of the first traveling motor and the second traveling motor and stop the other thereof in order to turn the cleaner body 110 right or left.

A suspension unit may be installed inside the cleaner body 110. The suspension unit may include a coil spring. The suspension unit may absorb shock and vibrations transmitted from the wheel 220 when the cleaner body 110 travels by using the elastic force of the coil spring.

In addition, an elevating unit which adjusts a height of the cleaner body 110 may be installed in the suspension unit. The elevating unit is installed to be movable up and down in the suspension unit, and may be coupled to the cleaner body 100. Therefore, when the elevating unit is moved upward from the suspension unit, the cleaner body 100 may be moved upward together with the elevating unit, and when the elevating unit is moved downward from the suspension unit, the cleaner body 100 may be moved downward together with the elevating unit. The cleaner body 100 may be moved up and down by the elevating unit to adjust the height.

The wheel of the wheel 220 may clean the floor surface while a bottom surface portion of the cleaning nozzle 120 is moved in close contact with the floor surface when the cleaner body 110 travels on a hard floor surface. However, when a carpet is laid on the floor surface which is a cleaning target surface, slip occurs in the wheel of the wheel 220, and thus, traveling performance of the cleaner body 110 may be reduced, and the traveling performance of the cleaner body 110 may be reduced by a force of the cleaning nozzle 120 which sucks the carpet.

However, the elevating unit adjusts the height of the cleaner body 110 according to a slip rate of the wheel of the wheel 220. Accordingly, since it is possible to adjust a degree to which the bottom surface portion of the cleaning nozzle 120 is in close contact with the cleaning target surface, the traveling performance of the cleaner body 110 can be maintained regardless of a material of the cleaning target surface.

Meanwhile, if the wheel of the wheel 220 disposed on the left side of the cleaner body 110 is disposed in a state of being connected to the first traveling motor through the first gear and the wheel of the wheel 220 disposed on the right side of the cleaner body 110 is disposed in a state of being connected to the second traveling motor through the second gear, when the user attempts to travel the cleaner body 110 in the manual mode in a state where the first traveling motor and the second traveling motor are stopped, all the wheels of the right and left wheels 220 cannot be rotated. Therefore, in the manual mode of the cleaner body 110, the wheels of the right and left wheels 220 and the first and second traveling motors must be disconnected from each other. To this end, preferably, a clutch is disposed inside the cleaner body 110, and the clutch connects the wheels of the right and left wheels 220 and the first and second traveling motors to each other when the cleaner body 110 is in the automatic mode, and disconnects the wheels of the right and left wheels 220 and the first and second traveling motors from each other when the cleaner body 110 is in the manual mode.

A battery (not illustrated) for supplying power to an electrical equipment of the cleaner 100 is mounted on the cleaner body 110. The battery is configured to be rechargeable, and may be configured to be detachable from the cleaner body 110.

A dust container accommodating portion 112 is provided in the cleaner body 110, and the dust container 140 which separates and collects dust in the sucked air is detachably coupled to the dust container accommodating portion 112.

The dust container accommodating portion 112 may have a shape opened forward and upward of the cleaner body 110 and may be formed to be recessed from a front side toward a rear side of the cleaner body 110. The dust container accommodating portion 112 may be formed by opening the front, upper, and lower sides of the cleaning body 110.

The dust container accommodating portion 112 may be formed at a different location (for example, a rear side of the cleaner body 110) depending on a type of cleaner.

The dust container 140 is detachably coupled to the dust container accommodating portion 112. A portion of the dust container 140 may be accommodated in the dust container accommodating portion 112, and another portion of the dust container 140 may be formed to protrude forward of the cleaner body 110.

The dust container 140 has an inlet 142 through which air containing dust is introduced and an outlet 143 through which the air from which the dust is separated is discharged, and when the dust container 140 is mounted on the dust container accommodating portion 112, the inlet 142 and the outlet 143 are configured to communicate with a first opening 116 and a second opening 117 formed in an inner wall of the dust container accommodating portion 112, respectively.

An intake passage formed inside the cleaner body 110 corresponds to a passage from the cleaning nozzle 120 to the first opening 116, and the exhaust passage corresponds to a passage from the second opening 117 to an exhaust port.

According to this configuration, air containing dust introduced through the cleaning nozzle 120 is introduced into the dust container 140 through the intake passage inside the cleaner body 110, and the air and dust are separated from each other while passing through at least one filter unit (for example, cyclone, filter, or the like) in the dust container 140. The dust is collected in the dust container 140, and the air is discharged from the dust container 140 and then finally discharged to the outside through the exhaust port through the exhaust passage inside the cleaner body 110.

An upper cover 113 covering the dust container 140 accommodated in the dust container accommodating portion 112 is disposed in the cleaner body 110. The upper cover 113 may be hinge-connected to one side of the cleaner body 110 so as to be rotatable. The upper cover 113 may cover the open upper side of the dust container accommodating portion 112 to cover the upper side of the dust container 140. In addition, the upper cover 113 may be separated from the cleaner body 110 so as to be detachable to the cleaner body 110.

In a state in which the upper cover 113 is disposed to cover the dust container 140, separation of the dust container 140 from the dust container accommodating portion 112 may be limited.

A handle 114 is provided on the upper side of the upper cover 113. The above-described photographing unit 115 may be disposed in the handle 114. In this case, preferably, the photographing unit 115 is disposed to be inclined with respect to the bottom surface of the cleaner body 110 so as to photograph the front and the upper side together.

The photographing unit 115 is provided in the cleaner body 110 and may capture an image for simultaneous localization and mapping (SLAM) of the cleaner. The image captured by the photographing unit 115 is used to generate a map of a traveling area or to detect a current position in the traveling area.

The photographing unit 115 may generate 3D coordinate information related to the surroundings of the cleaner body 110. That is, the photographing unit 115 may be a 3D depth camera which calculates a distance between the cleaner 100 and an object to be photographed. Accordingly, field data for the 3D coordinate information may be generated.

Specifically, the photographing unit 115 may capture a 2D image related to the surrounding of the cleaner body 110 and may generate plurality of 3D coordinate information corresponding to the captured 2D image.

In one embodiment, the photographing unit 115 includes two or more cameras for obtaining the conventional 2D image, and may be configured in a stereo-vision method for generating 3D coordinate information by combining two or more images obtained from the two or more cameras.

Specifically, the photographing unit 115 according to the embodiment includes a first pattern irradiation unit which emits a first pattern of light downward toward the front side of the main body, a second pattern irradiation unit which emits a second pattern of light upward toward the front side of the main body, and an image acquisition unit for obtaining an image of the front side of the main body. Accordingly, the image acquisition unit may acquire an image of a region to which the light of the first pattern and the light of the second pattern are incident.

In another embodiment, the photographing unit 115 includes an infrared pattern emitting unit which emits an infrared pattern together with a single camera, and captures a shape in which an infrared pattern emitted from the infrared pattern emitting unit is projected onto an object to be photographed. Accordingly, a distance between the photographing unit 115 and the object to be photographed may be measured. The photographing unit 115 may be an Infra-Red (IR) photographing unit 115.

In still another embodiment, the photographing unit 115 includes a light emitting unit which emits light together with a single camera, receives a portion of the laser emitted from the light emitting unit which is reflected from the object to be photographed, and analyzes the received laser. Accordingly, the distance between the photographing unit 115 and the object to be photographed may be measured. The photographing unit 115 may be a Time of Flight (TOF) photographing unit 115.

Specifically, the laser of the photographing unit 115 as described above is configured to emit a laser extending in at least one direction. In an example, the photographing unit 115 may include first and second lasers, the first laser may emit a linear laser intersecting each other, and the second laser may emit a single linear laser. According to this, a lowermost laser is used to detect an obstacle in a bottom portion, an uppermost laser is used to detect an obstacle in the upper portion, and an intermediate laser between the lowest laser and the uppermost laser is used to detect an obstacle in a middle portion.

The sensing unit 130 may be disposed below the upper cover 113, and the sensing unit 130 may be detachably coupled to the dust container 140.

The sensing unit 130 is disposed in the cleaner body 110 and detects information related to an environment in which the cleaner body 110 is located. The sensing unit 130 detects information related to the environment to generate field data.

The sensing unit 130 detects surrounding features (including an obstacle) so that the cleaner 100 does not collide with an obstacle. The sensing unit 130 may detect information outside the cleaner 100. The sensing unit 130 may detect a user around the cleaner 100. The sensing unit 130 may detect an object around the cleaner 100.

In addition, the sensing unit 130 is configured to enable panning (moving left and right) and tilting (disposed to be inclined an up-down direction) in order to improve the detection function of the cleaner and a traveling function of the robot cleaner.

The sensing unit 130 is disposed on the front side of the cleaner body 110 and disposed between the dust container 140 and the upper cover 113. A coupling protrusion 132d is formed to protrude from a lower surface of the sensing unit 130, and a coupling groove 141 into which the coupling protrusion 132d is inserted so as to be coupled thereto is formed on an upper surface of the dust container 141. When the upper cover 113 covers the upper portion of the dust container accommodating portion 112, the coupling protrusion 132d is inserted into the coupling groove 141, and thus, the dust container 140 is coupled to the sensing unit 130, and thus, can be separated from the cleaner body 110. On the contrary, when the upper cover 113 opens the upper side of the dust container accommodating portion 112, the coupling protrusion 132d comes out from the coupling groove 141. Accordingly, the dust container 140 is removed from the sensing unit 130, and thus, is disconnected from the cleaner body 110.

The sensing unit 130 may include at least one of an external signal detection sensor, an obstacle detection sensor, a cliff detection sensor, a lower camera sensor, an upper camera sensor, an encoder, a shock detection sensor, and a microphone.

The external signal detection sensor may detect an external signal of the cleaner 100. For example, the external signal detection sensor may be an infrared ray sensor, an ultrasonic sensor, or a radio frequency sensor. Accordingly, field data for the external signal may be generated.

The cleaner 100 may detect information on a location and a direction of a charging station by receiving a guide signal generated by the charging station using an external signal detection sensor. In this case, the charging station may transmit a guide signal indicating a direction and distance so that the cleaner 100 can return. That is, the cleaner 100 may receive a signal transmitted from the charging station, determine a current position, set a movement direction, and return to the charging station.

The obstacle detection sensor may detect an obstacle in front thereof. Accordingly, field data on the obstacle is generated.

The obstacle detection sensor may detect an object in the movement direction of the cleaner 100 and transmit the generated field data to the controller. That is, the obstacle detection sensor may detect a protrusion, a fixture, furniture, a wall, a wall edge, or the like existing on a movement path of the cleaner 100 and transmit the field data to the controller.

For example, the obstacle detection sensor may be an infrared sensor, an ultrasonic sensor, an RF sensor, or a geomagnetic sensor. The cleaner 100 may use one type of sensor as an obstacle detection sensor or may use two or more types of sensors together as needed.

The cliff detection sensor (Cliff Sensor) may detect an obstacle on the floor supporting the cleaner body 110 by mainly using various types of optical sensors. Accordingly, field data for an obstacle on the floor is generated.

Like the obstacle detection sensor, the cliff detection sensor may be an infrared sensor having a light emitting unit and a light receiving unit, an ultrasonic sensor, an RF sensor, a Position Sensitive Detector (PSD) sensor, and the like.

For example, the cliff detection sensor may be a PSD sensor, but may be configured of a plurality of different types of sensors. The PSD sensor includes a light emitting unit which emits infrared rays to an obstacle and a light receiving unit which receives infrared rays reflected from the obstacle, and is generally configured in a module shape. When an obstacle is detected using a PSD sensor, a stable measurement value can be obtained regardless of the difference in reflectance and color of the obstacle.

The controller may measure an infrared angle between an infrared light emitted by the cliff detection sensor toward the ground and a reflected signal reflected by an obstacle and received, and thus, detect a cliff and obtain field data for the depth.

The lower camera sensor acquires image information (field data) on the cleaning target surface while the cleaner 100 is moving. The lower camera sensor is also referred to as an optical flow sensor. The lower camera sensor may generate image data (field data) in a predetermined format by converting a downward image input from an image sensor provided in the sensor. Field data for the image recognized through the lower camera sensor may be generated.

The controller can detect a position of a mobile robot regardless of sliding of the mobile robot using the lower camera sensor. The controller may compare and analyze image data captured by the lower camera sensor over time to calculate a movement distance and a movement direction, and calculate the position of the mobile robot based on the movement distance and the movement direction.

The upper camera sensor is installed to face the upper side or the front side of the cleaner 100 so as to photograph the surroundings of the cleaner 100. When the cleaner 100 includes a plurality of upper camera sensors, the camera sensors may be formed on an upper portion or a side surface of the mobile robot at a certain distance or at a certain angle. Field data for an image recognized through the upper camera sensor may be generated.

The encoder may detect information related to an operation of a motor which operates the wheel of the wheel 220. Accordingly, field data on the operation of the motor is generated.

The shock detection sensor may detect an impact when the cleaner 100 collides with an external obstacle. Accordingly, field data on external impact is generated.

The microphone can detect an external sound. Accordingly, field data for the external sound is generated.

In the present embodiment, the sensing unit 130 includes an image sensor. In the present embodiment, the field data is image information obtained by the image sensor or feature point information extracted from the image information, but is not necessarily limited thereto.

Meanwhile, a gender 118 may be disposed on an open lower side of the dust container accommodating portion 112. The gender 118 may be coupled to the cleaner body 110 to form a portion of the cleaner body 110. That is, when the gender 118 is coupled to the cleaner body 110, the gender 118 may be interpreted as the same configuration as the cleaner body 110. The dust container 140 for storing foreign substances may be mounted on the gender 118. The gender 118 may connect the cleaner body 110 and the cleaning nozzle 120. The gender 118 may connect the intake passage of the cleaner body 110 and the intake passage of the cleaning nozzle 120 to each other.

The cleaning nozzle 120 is configured to suck air containing dust or wipe the floor. Here, the cleaning nozzle 120 which sucks air containing dust may be referred to as a suction module, and the cleaning nozzle 120 configured to wipe the floor may be referred to as a mop module.

The cleaning nozzle 120 may be detachably coupled to the cleaner body 110. When the suction module is separated from the cleaner body 110, the mop module may be detachably coupled to the cleaner body 110 as an alternative of the separated suction module. Accordingly, when the user wants to remove dust from the floor, the suction module may be mounted on the cleaner body 110, and when the user wants to clean the floor, the mop module may be mounted on the cleaner body 110.

The cleaning nozzle 120 may be configured to have a function of cleaning the floor after sucking air containing dust.

The cleaning nozzle 120 may be disposed in a lower portion of the cleaner body 110 or may be disposed in a form protruding from one side of the cleaner body 110 as illustrated. The one side may be a side on which the cleaner body 110 travel in a forward direction, that is, the front side of the cleaner body 110. The cleaning nozzle 120 is disposed in front of the wheel 220, and a portion of the cleaning nozzle 120 may protrude forward from the dust container 140.

In the drawings, the cleaning nozzle 120 has a shape protruding from one side of the cleaner body 110 to the front side and both right and left sides. Specifically, the front end of the cleaning nozzle 120 is disposed at a position spaced forward from one side of the cleaner body 110, and the right and left ends of the cleaning nozzle 120 are respectively disposed at positions spaced apart from one side of the cleaner body 110 to both right and left sides.

A suction motor may be installed inside the cleaner body 110. An impeller (not illustrated) may be coupled to a rotating shaft of the suction motor. When the suction motor is driven and the impeller rotates together with the rotating shaft, the impeller may generate a suction force.

An intake passage may be formed inside the cleaner body 110. The foreign substances including dust from the cleaning target surface flow into the cleaning nozzle 120 by the suction force generated by the driving force of the suction motor, and the foreign substances introduced into the cleaning nozzle 120 may flow into the intake passage.

The cleaning nozzle 120 may clean the floor surface, which is the cleaning target surface, when the cleaner body 110 travels in the automatic mode. The cleaning nozzle 120 may be disposed adjacent to a bottom surface of a front surface of the cleaner body 110. A suction port through which air is sucked may be formed in a bottom surface portion of the cleaning nozzle 120. When the cleaning nozzle 120 is coupled to the cleaner body 110, the suction port may be disposed toward the floor surface.

The cleaning nozzle 120 may be coupled to the cleaner body 110 through the gender 118. The cleaning nozzle 120 may communicate with the intake passage of the cleaner body 110 through the gender 118. The cleaning nozzle 120 may be disposed below the dust container 140 disposed on the front surface of the cleaner body 110.

The cleaning nozzle 120 may include a case in which a suction port is formed in a bottom surface portion, and a brush unit may be rotatably provided in the case. The case may provide an empty space so that the brush unit may be rotatably provided therein. The brush unit may include a rotating shaft which is elongated right and left, and a brush protruding from an outer periphery of the rotating shaft. The rotating shaft of the brush unit may be rotatably coupled to the right side and the left side of the case.

Cases 121 and 122 of the cleaning nozzle 120 may include a center case 121, and side cases 122 which are disposed on both sides of the center case 121 to form the left surface and the right surface of the cases 121 and 122 of the cleaning nozzle 120. A suction port may be formed in a bottom surface portion of the center case 121. Both sides of the central case 121 may be opened, and the side cases 122 on both sides may be respectively coupled to both sides of the center case 121 so as to shield both open sides of the center case 121.

The brush unit is disposed so that the brush protrudes downward through the suction port formed in the bottom surface portion of the case. Accordingly, when the suction motor is driven, the brush unit can suck the foreign substances including dust on the floor surface which is the cleaning target surface while being rotated by the suction force, and the sucked foreign substances can be sucked into the case by the suction force. It is preferable that the brush is formed of a material which does not generate triboelectricity so that the foreign substances do not adhere easily.

The gender 118 may be coupled to the front surface of the cleaner body 110. The gender 118 may connect the cleaner body 110 and the cleaning nozzle 120 to each other. The cleaning nozzle 120 may be detachably coupled to the gender 118. The gender 118 may support the lower side of the dust container 140.

The dust container 140 is detachably coupled to the front surface of the cleaner body 110, and the lower side of the dust container 140 may be supported by the gender 118. The dust container 140 may include an empty cylindrical case therein. A filter unit for separating the foreign substances and air from the air sucked through the intake passage of the cleaner body 110 may be disposed inside the cylindrical case. The filter unit may include a plurality of cyclones. The foreign substances including dust filtered by the filter unit may fall into the inside of the dust container 140 and be accommodated, and only the air is discharged to the outside of the dust container 140, and then, is moved to the suction motor side by the suction force of the suction motor. Thereafter, the air can be discharged to the outside of the cleaner body 110.

The lower surface of the dust container 140 may be opened, and the open lower surface of the dust container 140 may be shielded by a lid 145. One side of the lid 145 may be rotatably coupled to the dust container 140 to be opened and closed. When the lid 145 is opened, the opened lower side of the dust container 140 may be opened, and foreign substances contained in the dust container 140 may fall through the opened lower side of the dust container 140. After the user separates the dust container 140 from the cleaner body 110, the user may open the lid to discard the foreign substances contained in the dust container 140. When the dust container 140 is coupled to the cleaner body 110, the dust container 140 is seated on the gender 118. That is, the lid of the dust container 140 is seated on the upper portion of the gender 118.

As described above, the cleaning nozzle 120 is provided in close contact with the floor surface, which is a cleaning target surface, and thus, can automatically clean the floor surface when the cleaner body 110 travels in the automatic mode. However, when the user wants to clean manually, after the user inputs the manual mode traveling of the cleaner body 110 through the mode selection input unit provided in the cleaner body 110, the user removes the cleaning nozzle 120 from the cleaning body 110, and then, can couple a manual cleaning nozzle to the cleaning body so as to manually clean. The manual cleaning nozzle may include a bellows-shaped long hose, and in this case, the manual cleaning nozzle may be connected to the cleaner body 110 near the hose.

Meanwhile, the cleaner 100 according to the present disclosure is configured to enable both the automatic cleaning and the manual cleaning. Accordingly, when the cleaner 100 is in the automatic cleaning mode, the wheel 220 is rotated by the driving force of the traveling drive motor, and thus, the cleaner body 110 travels. However, when the cleaner 100 is in the manual cleaning mode, the power should be disconnected between the traveling drive motor and the wheel 220 so that the wheel 220 can be rotated by a force for the user to pull or push the cleaner body 110. As described above, a configuration capable of connecting or disconnecting the power of the traveling drive motor and the wheel 220 will be described below with reference to FIGS. 3 to 7.

Figure 3:
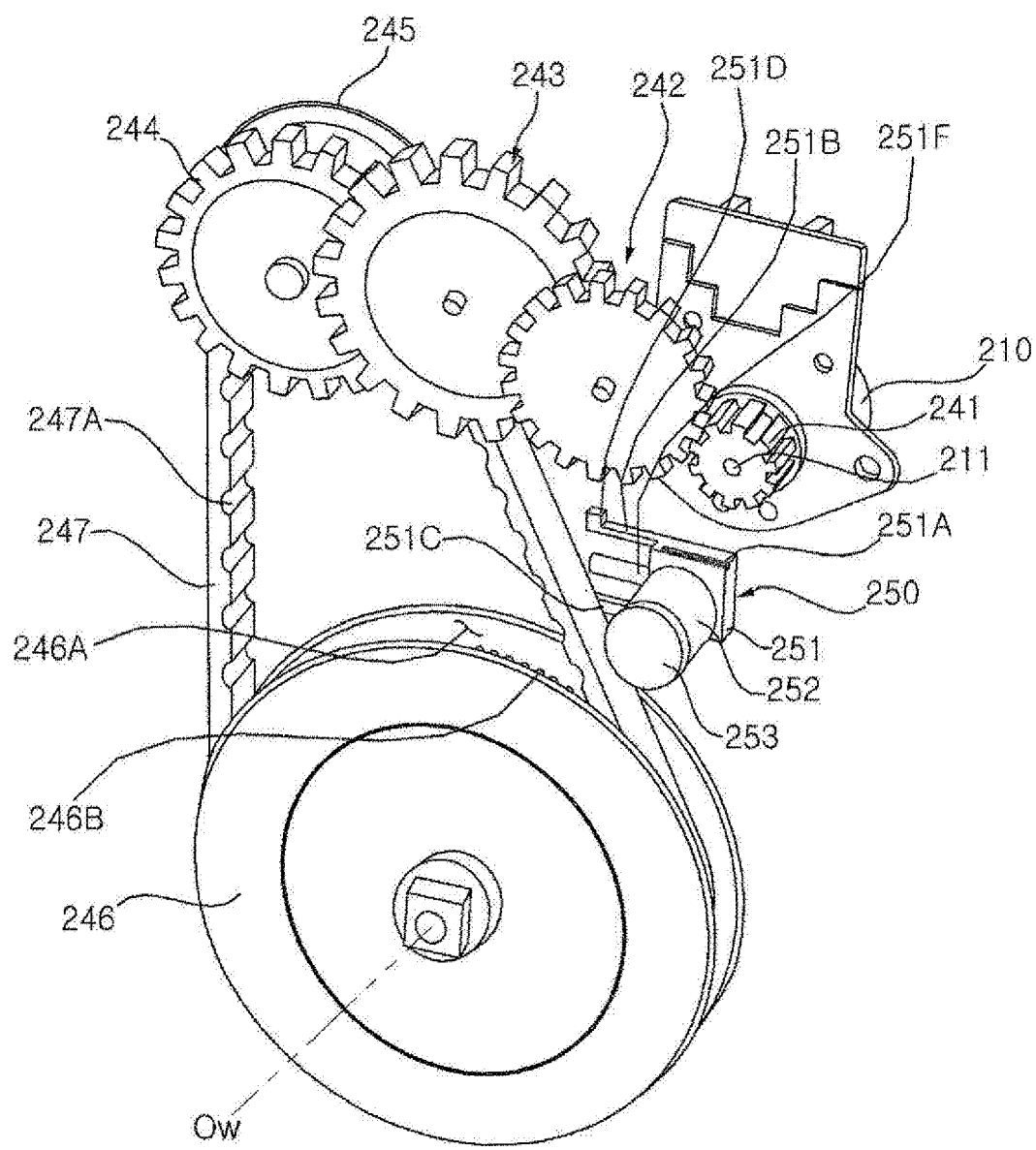
FIG. 3 is a front perspective view in a state where power is disconnected between a first pulley and a second pulley.
Figure 4:
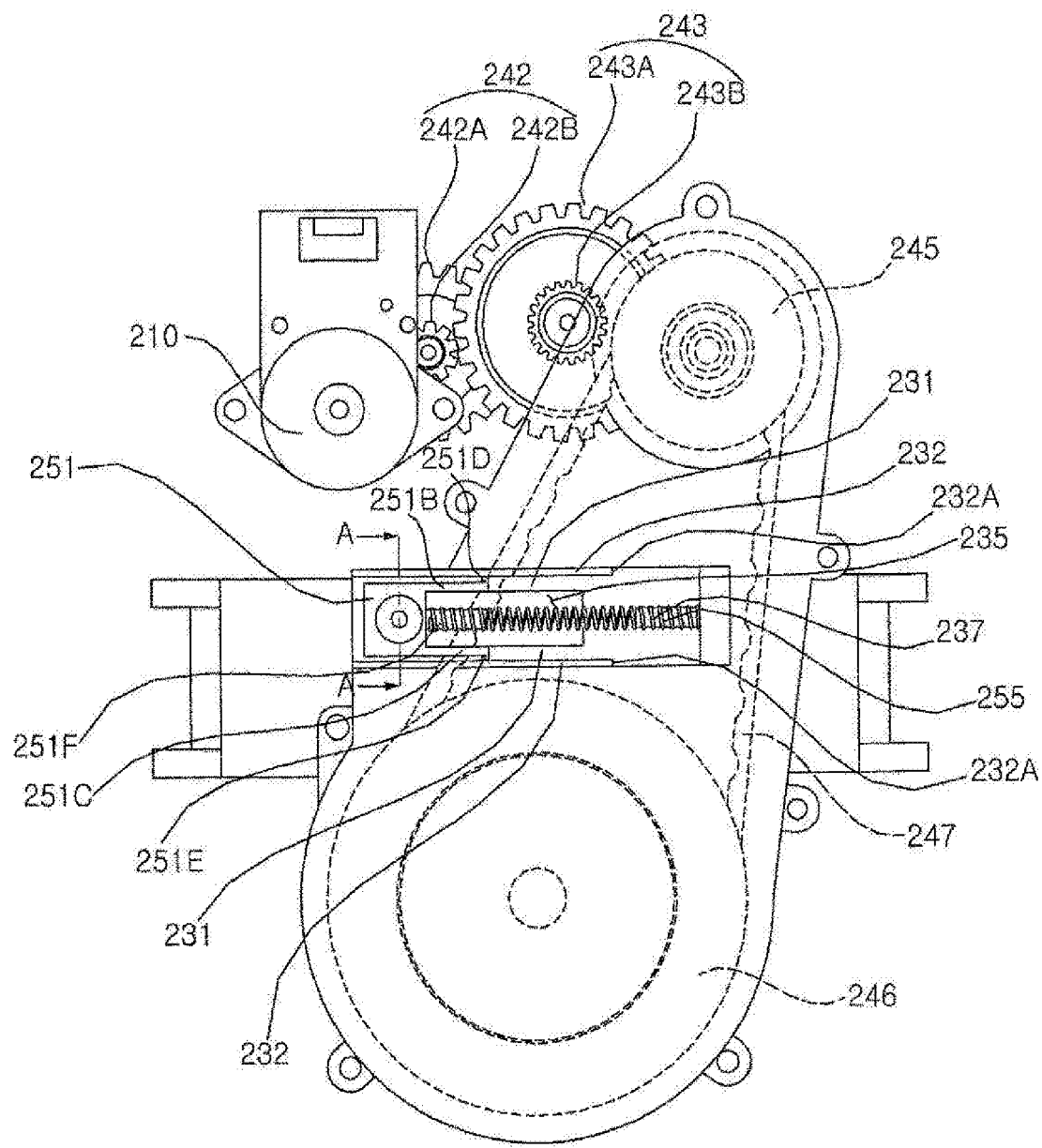
FIG. 4 is a rear view in a state where the power is disconnected between the first pulley and the second pulley.
Figure 5:
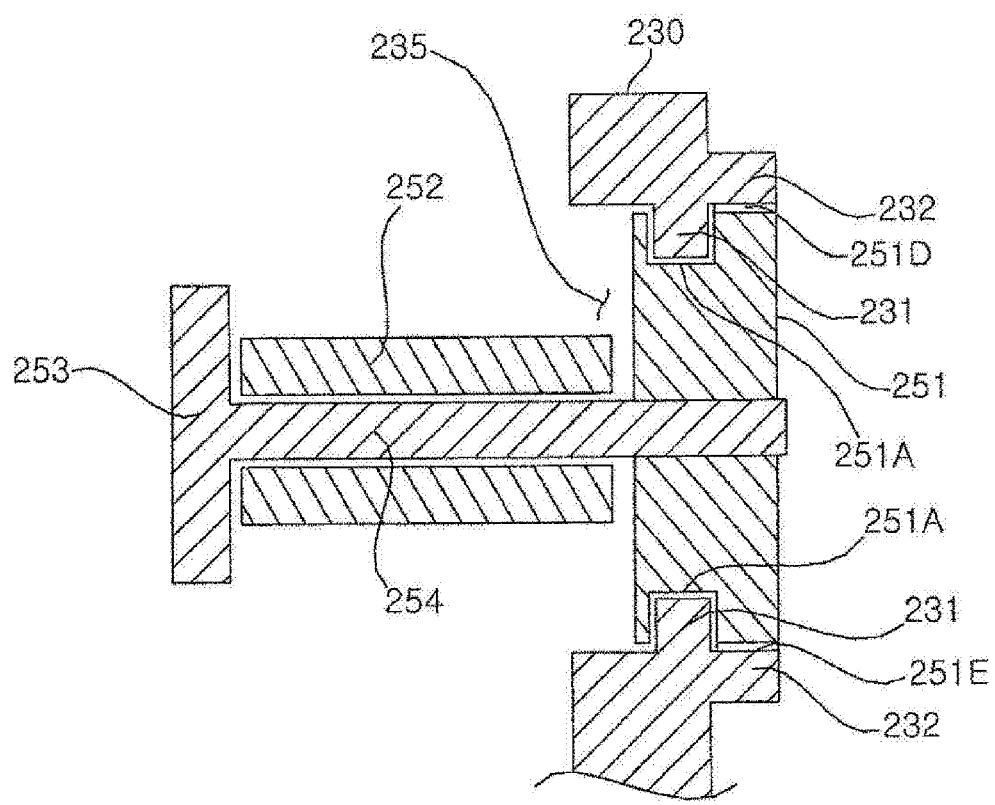
FIG. 5 is a cross-sectional view taken along line A-A of FIG. 4.
Figure 6:
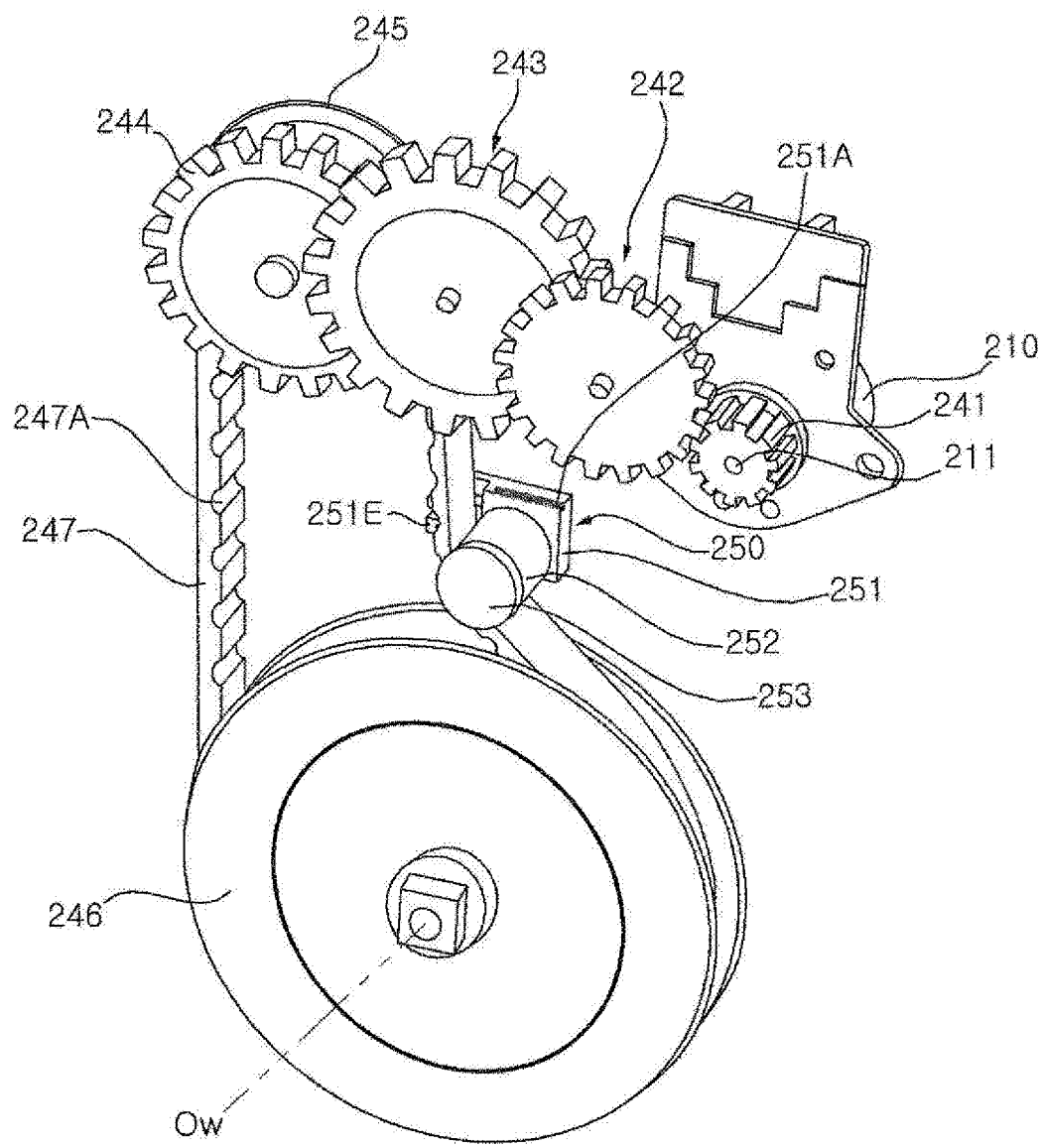
FIG. 6 is a front perspective view in a state where the power is connected between the first pulley and the second pulley.
Figure 7:
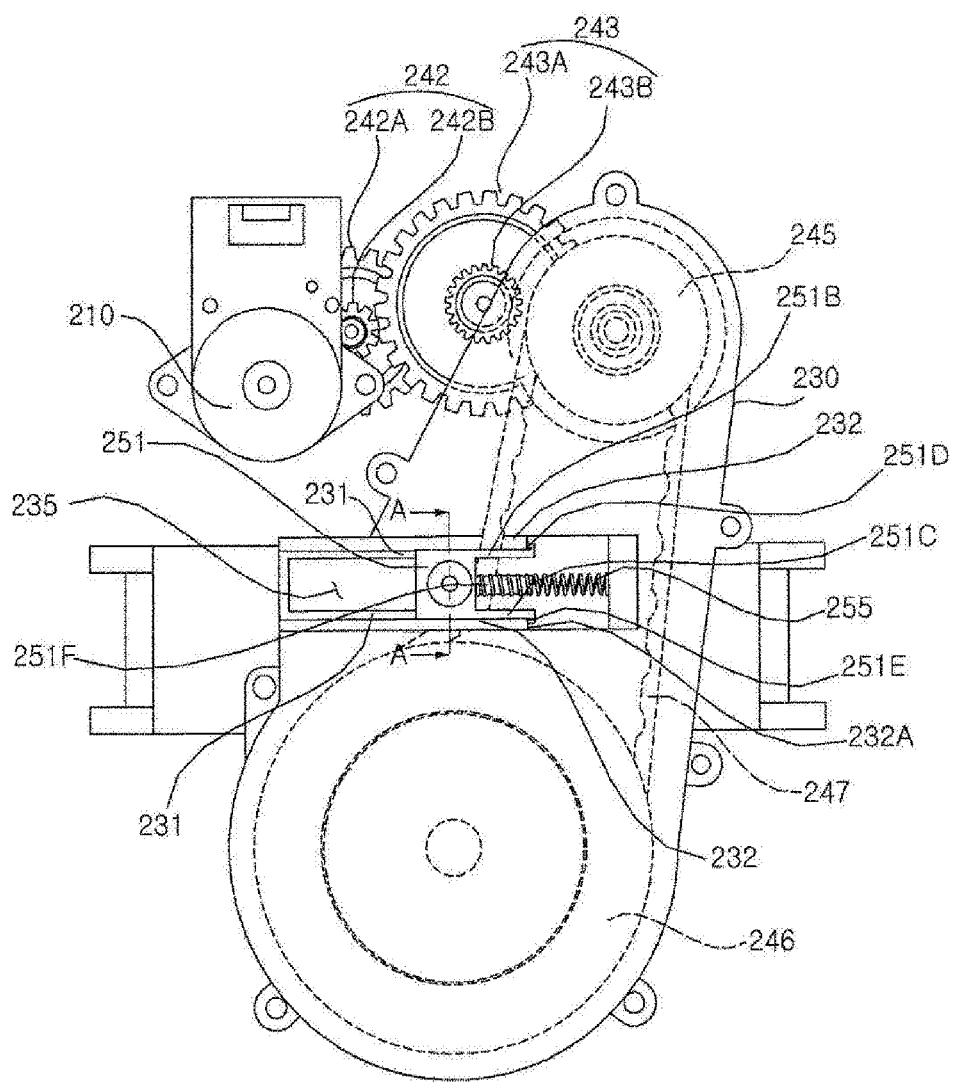
FIG. 7 is a rear view in a state where the power is connected between the first pulley and the second pulley.

FIG. 3 is a front perspective view in a state where power is disconnected between a first pulley and a second pulley, FIG. 4 is a rear view in a state where the power is disconnected between the first pulley and the second pulley, FIG. 5 is a cross-sectional view taken along line A-A of FIG. 4, FIG. 6 is a front perspective view in a state where the power is connected between the first pulley and the second pulley, and FIG. 7 is a rear view in a state where the power is connected between the first pulley and the second pulley.

With reference to FIGS. 1 to 7, a traveling drive motor 210 for driving the wheel 220 is disposed in the cleaner body 110. The wheel 220 supports the cleaner body 110 so that the clean body 110 is movable with respect to the floor. The wheel 220 may be rotated by the driving force of the traveling drive motor 210 to travel the cleaner body 110.

A housing 230 is coupled to the cleaner body 110, and the traveling drive motor 210 may be coupled to the outside of the housing 230. A rotating shaft 211 of the traveling drive motor 210 may pass through one side of the housing 230 from the outside of the housing 230 and may be disposed inside the housing 230. Here, the housing 230 may be a housing surrounding a plurality of gears 241, 242, 243, and 244 described later, and may be an assembly in which a panel rotatably coupled a first pulley 245 and a second pulley 246 described later to the housing surrounding the plurality of gears 241, 242, 243, and 244 is assembled.

The first pulley 245, the second pulley 246, a belt 247, and the plurality of gears 241, 242, 243 and 244 may be disposed inside the housing 230. The first pulley 245, the second pulley 246, and the plurality of gears 241, 242, 243, and 244 may be rotatably coupled to the housing 230, and the belt 247 can connect the first pulley 245 and a second pulley 246 to each other.

The plurality of gears 241, 242, 243, 244 is provided with four gears, but does not necessarily have to be provided with four gears, and may be provided with at least one gear. When at least one of the plurality of gears 241, 242, 243, and 244 is provided, a gear directly coupled to the rotating shaft 211 of the traveling drive motor 210 is provided, and thus, the gear can be rotated by the driving force of the traveling drive motor 210. When at least one of the plurality of gears 241, 242, 243, and 244 is provided, the first pulley 245 may be connected to the at least one gear. In addition, when the plurality of gears 241, 242, 243, 244 are not all provided, the first pulley 245 may be directly coupled to the rotating shaft 211 of the traveling drive motor 210 and rotated by the driving force of the traveling drive motor 210.

The second pulley 246 is rotated when the first pulley 245 is rotated to rotate the wheel 220. The second pulley 246 may be connected to the inner side of the wheel 220 to rotate the wheel 220. A rotation center of the second pulley 246 and a rotation center of the wheel 220 may be disposed on the same axis Ow. Each of the first pulley 245 and the second pulley 246 may be formed in a circular shape. The second pulley 246 may have a diameter larger than that of the first pulley 245.

The belt 247 may connect the first pulley 245 and the second pulley 246 to each other. The belt 247 may connect a rotational force of the first pulley 245 and a rotational force of the second pulley 246 when tension of the belt 247 is increased by a clutch 250 described later. When the rotational force of the first pulley 245 and the rotational force of the second pulley 246 are connected to each other, when any one of the first pulley 245 and the second pulley 246 is rotated, the other thereof may be rotated by the rotational force of the one. In addition, the belt 247 may disconnect the rotational force of the first pulley 245 and the rotational force of the second pulley 246 when the tension of the belt 247 is reduced by the clutch 250. When the rotational force of the first pulley 245 and the rotational force of the second pulley 246 are disconnected, even if one of the first pulley 245 and the second pulley 246 is rotated, the other may not be rotated.

The clutch 250 may be installed in the housing 230 to be linearly movable. The clutch 250 may connect or disconnect the power between the first pulley 245 and the second pulley 246 by adjusting the tension of the belt 247 when the clutch 25 moves in a straight line.

The clutch 250 may connect the power between the first pulley 245 and the second pulley 246 in a preset autonomous traveling mode to perform autonomous traveling. In addition, the clutch 250 may disconnect the power between the first pulley 245 and the second pulley 246 so that the clutch 250 moves in a preset manual mode.

The clutch 250 may include a base 251 which is installed to be linearly movable in the housing 230, and a tension roller 252 which is rotatably installed on the base 251 and in contact with the belt 247 to adjust the tension of the belt 247. A shaft 254 to which the tension roller 252 is rotatably coupled may be protruded from the base 251. The tension roller 252 may be rotatably coupled to an outer peripheral surface of the shaft 254. However, in the present embodiment, the shaft 254 is not integrally formed with the base 251, and a shaft member 253 on which the shaft 254 is formed may be separately coupled. That is, in the present embodiment, the clutch 250 has the shaft 254 to which the tension roller 252 is rotatably coupled, and further includes the shaft member 253 which rotatably couples the tension roller 252 to the base 251.

A rectangular hole 235 may be formed in the housing 230. The base 251 may be inserted and disposed in the rectangular hole 235 to be linearly moved. First guide protrusions 231 may be formed on the upper and lower sides of the rectangular hole 235 to be extended in a linear movement direction of the base 251. Further, guide grooves 251A into which the first guide protrusions 231 are inserted may be formed on upper and lower surfaces of the base 251. The first guide protrusions 231 are inserted into the guide grooves 251A, and thus, the base 251 can be moved linearly while being guided by the first guide protrusion 231.

A second guide protrusion 232 protruding in a direction orthogonal to a protrusion direction of the first guide protrusion 231 may be further formed in the housing 230. The second guide protrusion 232 is formed to be extended in the linear movement direction of the base 251 to guide the movements of the upper and lower surfaces of the base 251. The second guide protrusion 232 includes an upper second guide protrusion 232 which is disposed on the upper side of the base 251 to guide the movement of the upper surface of the base 251, and a lower second guide protrusion 232 which is disposed on the lower side of the base 251 to guide the movement of the lower surface of the base 251.

Hooks 251B and 251C may be protruded from the base 251. The hooks 251B and 251C may be locked to the housing 230 at a position where the tension roller 252 connects the power between the first pulley 245 and the second pulley 246. The hooks 251B and 251C may be formed to protrude in a direction in which the base 251 is linearly moved to connect the power between the first pulley 245 and the second pulley 246.

The hooks 251B and 251C include an upper hook 251B formed in an upper portion of one side of the base 251 in the linear movement direction, and a lower hook 251C formed in a lower portion of the one side of the base 251 in the linear movement direction.

Hook protrusions 251D and 251E may be formed on the hooks 251B and 251C, respectively. The hook protrusions 251D and 251E may be formed to protrude toward the upper and lower sides which the outside of the base 251. That is, the hook protrusion 251D formed on the upper hook 251B is formed to protrude upward from the upper side of the end of the upper hook 251B, and may protrude upward from the upper side of the base 251. In addition, the hook protrusion 251E formed on the lower hook 251C is formed to protrude downward from the lower side of the end of the lower hook 251C, and may protrude downward from the lower side of the base 251.

Locking steps 232A to which the hook protrusions 251D and 251E are locked may be formed in the housing 230. The locking step 232A may be an end of the second guide protrusion 232. The hook protrusions 251D and 251E are moved in a state of being in contact with the second guide protrusion 232 when the base 251 is linearly moved, and may be locked to the end of the second guide protrusion 232 at a position at which the tension roller 252 connects the power between the first pulley 245 and the second pulley 246. The hook protrusion 251D formed in the upper hook 251B is moved in a state of being in contact with the upper second guide protrusion 232 when the base 251 is linearly moved, and may be locked to the end of the upper second guide protrusion 232 by the upper hook 251B being moved upward by its own elastic force at a position at which the tension roller 252 connects the power between the first pulley 245 and the second pulley 246. The hook protrusion 251E formed in the lower hook 251C is moved in a state of being in contact with the lower second guide protrusion 232 when the base 251 is linearly moved, and may be locked to the end of the lower second guide protrusion 232 by the lower hook 251C being moved downward by its own elastic force at the position at which the tension roller 252 connects the power between the first pulley 245 and the second pulley 246.

The clutch 250 may further include an elastic member 255 which provides an elastic force for moving the base 251 to an original position thereof when the hooks 251D and 251E are released from the housing 230. The elastic member 255 may be formed of a coil spring. A first insertion boss 251F inserted into one end of the coil spring may be formed to protrude from the base 251, and a second insertion boss 237 inserted into the other end of the coil spring may be formed to protrude from the housing 230.

The plurality of gears 241, 242, 243 and 244 may include the first gear 241, the second gear 242, the third gear 243, and the fourth gear 244. The first gear 241 may be coupled to the rotating shaft 211 of the traveling drive motor 210. The second gear 242 may mesh with the first gear 241 and be rotated in a direction opposite to the rotation direction of the first gear 241. The third gear 243 may mesh with the second gear 242 and be rotated in a direction opposite to the rotation direction of the second gear 242. The fourth gear 244 may mesh with the third gear 243 and be rotated in a direction opposite to the rotation direction of the third gear 243. The first pulley 245 may be connected to the fourth gear 244. The rotation center of the fourth gear 244 and the rotation center of the first pulley 245 may be disposed on the same axis.

The second gear 242 may be configured of a two-stage gear in which two gears 242A and 242B having different diameters are disposed coaxially. That is, the second gear 242 may include the gear 242A having a large diameter and the gear 242B having a small diameter. The gear 242A having a large diameter in the second gear 242 may mesh with the first gear 241.

The third gear 243 may be configured of a two-stage gear in which two gears 243A and 243B having different diameters are disposed coaxially. That is, the third gear 243 may include the gear 243A having a large diameter and the gear 243B having a small diameter. The gear 243A having a large diameter in the third gear 243 may mesh with the gear 242B having a small diameter of the second gear 242.

The fourth gear 244 may mesh with the gear 243B having a small diameter of the third gear 243.

The plurality of gears 241, 242, 243 and 244 may be provided as at least one gear, and the at least one gear may be rotated by the driving force of the traveling drive motor 210 to rotate the first pulley 245.

A separation prevention groove 246A into which the belt 247 is inserted may be formed on an outer peripheral surface of each of the first pulley 245 and the second pulley 246. In the drawings, the separation prevention groove 246A is formed only on the outer peripheral surface of the second pulley (246). However, the first pulley 245 is only smaller in diameter than the second pulley 246, and has the same shape and configuration as those of the second pulley 246. Accordingly, it is sufficiently predictable that the separation prevention groove 246A is also formed in the first pulley 245 from the second pulley 246 illustrated in the drawings. Both sides of the separation prevention groove 246A formed in the first pulley 245 may be disposed parallel to each other. In addition, both side surfaces of the separation prevention groove 246A formed in the second pulley 246 may be disposed parallel to each other. In this way, even if the clutch 250 loosens the tension of the belt 247 in order to disconnect the power between the first pulley 245 and the second pulley 246, the belt 247 is disposed in a state of being inserted into the separation prevention groove 246A formed on the outer peripheral surface of each of the first pulley 245 and the second pulleys 246, and thus, the belt 247 is not separated from the first pulley 245 and the second pulley 246.

In the first pulley 245 and the second pulley 246, a plurality of locking protrusions 246B are formed on the bottom surface of the separation prevention groove 246A along the circumferential direction. In the drawings, the plurality of locking protrusions 246B are formed on the bottom surface of the separation prevention groove 246A formed in the second pulley 246. However, the first pulley 245 is only smaller in diameter than the second pulley 246, and has the same shape and configuration as those of the second pulley 246. Accordingly, it is sufficiently predictable that the plurality of locking protrusions 246B are also formed on the bottom surface of the separation prevention groove 246A formed in the first pulley 245 from the second pulley 246 illustrated in the drawings. Further, a plurality of locking grooves 247A meshing with the plurality of locking protrusions 246B are formed on an inner peripheral surface of the belt 247. The plurality of locking grooves 247A are also formed to be spaced apart from each other along the circumferential direction on the inner peripheral surface of the belt 247.

Therefore, when the clutch 250 increases the tension of the belt 247, the plurality of locking protrusions 246B are inserted into the plurality of locking grooves 247A. Accordingly, the belt 247 does not slip, and the state where the power is connected between the first pulley 245 and the second pulley 246 is maintained.

Conversely, when the clutch 250 loosens the tension of the belt 247, the plurality of locking protrusions 246B are separated from the plurality of locking grooves 247A. Accordingly, the belt 247 may slip, and the state where the power is disconnected between the first pulley 245 and the second pulley 246 is maintained. Of course, even in a state where the plurality of locking protrusions 246B are separated from the plurality of locking grooves 247A, that is, even in a state where the clutch 250 disconnects the power between the first pulley 245 and the second pulley 246, the state where the belt 247 is inserted into the separation prevention groove 246A formed on the outer peripheral surface of each of the first pulley 245 and the second pulley 246 is maintained. Therefore, even when the clutch 250 disconnects the power between the first pulley 245 and the second pulley 246 and the belt 247 is loosened, the belt 247 is not separated from the first pulley 245 and the second pulley 246.

Meanwhile, the base 251 may be linearly moved by a driving force of a power connection motor (not illustrated) connecting the power between the first pulley 245 and the second pulley 246. That is, a power connection motor for connecting the power between the first pulley 245 and the second pulley 246, a rotation gear which is coupled to a rotating shaft of the power connection motor, and a rack gear which meshes with the rotation gear, linearly moves, and is connected to the base may be further installed in the housing 230. The base 251 is linearly moved by the driving force of the power connection motor to connect the power between the first pulley 245 and the second pulley 246.

The cleaner body 110 may include a power connection input unit which drives the power connection motor so that the power connection input unit is exposed to the outside. When the user performs an input on the power connection input unit, the power connection motor may be driven.

Meanwhile, a connection passage which connects the cleaner body 110 and the cleaning zone 120 to each other may be formed in the cleaner body 110 and the cleaning nozzle 120. The power connection input unit does not necessarily need to be provided to be exposed to the outside of the cleaner body 110, and may be provided in any one of the connection passage formed in the cleaner body 110 and the connection passage formed in the cleaning nozzle 120. When the power connection input unit is provided in any one of the connection passage formed in the cleaner body 110 and the connection passage formed in the cleaning nozzle 120, the input is input to the power connection input unit by connecting the respective connection passages to each other. Accordingly, the power connection motor is driven, and thus, it is possible to connect the power between the first pulley 245 and the second pulley 246.

In addition, the cleaner body 110 may include a power release input unit so that the power release input unit is exposed to the outside. When the user performs an input on the power release input unit, the hook protrusions 251D and 251E of the hooks 251B and 251C may be released in the locking step 232A. A power release motor which is driven when the input is input to the power release input unit and pushes the hooks 251B and 251C may be installed in the housing 230, a rotation gear coupled to a rotating shaft of the power release motor and a rack gear which meshes with the rotation gear and moves linearly may be installed, and when the rack gear moves linearly and pushes the hooks 251B and 251C, the hook protrusions 251D and 251E of the hooks 251B and 251C are unlocked at the locking step 232A.

The power release input unit does not necessarily need to be provided to be exposed to the outside of the cleaner body 110, and may be provided in any one of the connection passage formed in the cleaner body 110 and the connection passage formed in the cleaning nozzle 120. When the power release input unit is provided in any one of the connection passage formed in the cleaner body 110 and the connection passage formed in the cleaning nozzle 120, the input is input to the power release input unit by disconnecting the respective connection passages to each other. Accordingly, the power release motor is driven, and thus, it is possible to disconnect the power between the first pulley 245 and the second pulley 246.

As described above, in the cleaner 100 according to the embodiment of the present disclosure, the clutch 250 adjusts the tension of the belt 247 while being linearly moved in the housing 230 and thus, connects or disconnect the power between the first pulley 245 and the second pulley 246. Accordingly, the user can connect the power between the traveling drive motor 210 and the wheel 220 when operating the cleaner 100 in the automatic cleaning mode, and can disconnect the power between the traveling drive motor 210 and the wheel 220 when operating the cleaner 100 in the manual cleaning mode.

In addition, the separation prevention groove 246A into which the belt 247 is inserted is formed on the outer peripheral surface of each of the first pulley 245 and the second pulley 246. Accordingly, even when the clutch 250 disconnects the power between the first pulley 245 and the second pulley 246 to loosen the tension of the belt 247 in order to disconnect the power between the traveling drive motor 210 and the wheel 220, the state where the belt 247 is inserted into the separation prevention groove 246A is maintained, and thus, the belt 247 is not separated from the first pulley 245 and the second pulley 246.

Those of ordinary skill in the technical field to which the present disclosure belongs will be able to understand that the present disclosure can be implemented in other concrete forms without changing its technical idea or essential features. Therefore, it should be understood that the embodiments described above are illustrative and non-limiting in all respects. The scope of the present disclosure is indicated by the scope of the claims to be described later rather than the detailed description above, and the meaning and scope of the claims and all changes or modified forms derived from the concept of equivalent are included in the scope of the present disclosure.

What is claimed is:

1. A cleaner comprising:
   a cleaner body;
   a wheel which movably supports the cleaner body with respect to a floor;
   a traveling drive motor which is disposed in the cleaner body;
   a first pulley which is rotated by a driving force of the traveling drive motor;
   a second pulley which is rotated when the first pulley rotates and rotates the wheel;
   a belt which connects the first pulley and the second pulley; and a clutch which adjusts tension of the belt to connect or disconnect power between the first pulley and the second pulley,
wherein the clutch connects the power between the first pulley and the second pulley in a preset autonomous traveling mode to perform autonomous traveling, and disconnects the power between the first pulley and the second pulley in a preset manual mode to perform manual movement.

2. The cleaner of claim 1, further comprising:
a housing in which the first pulley and the second pulley are rotatably provided,
wherein the clutch includes a base which is installed in the housing so as to be movable linearly, and a tension roller which is rotatably installed in the base and is in contact with the belt to adjust the tension of the belt.

3. The cleaner of claim 2, wherein a hook which is locked to the housing at a position where the tension roller connects the power between the first pulley and the second pulley is formed to protrude in the base.

4. The cleaner of claim 3, wherein the hook is formed to protrude in a direction in which the base is linearly moved to connect the power between the first pulley and the second pulley.

5. The cleaner of claim 3, wherein the hook includes:
an upper hook which is formed in an upper portion on one side in the linear movement direction of the base; and
a lower hook which is formed in a lower portion on one side in the linear movement direction of the base.

6. The cleaner of claim 3, wherein a hook protrusion is formed in the hook, and
wherein a locking step to which the hook protrusion is locked is formed in the housing.

7. The cleaner of claim 3, wherein the clutch further includes an elastic member which provides an elastic force for moving the base to an original position when the hook is unlocked from the housing.

8. The cleaner of claim 7, wherein the elastic member is a coil spring,
wherein a first insertion boss inserted into one end of the coil spring is formed to protrude from the base, and
wherein a second insertion boss inserted into the other end of the coil spring is formed to protrude from the housing.

9. The cleaner of claim 1, wherein the housing includes a rectangular hole and a first guide protrusion which is formed to be elongated in a linear movement direction of the base in an upper side and a lower side of the rectangular hole, and
wherein a guide groove into which the first guide protrusion is inserted is formed on upper and lower surfaces of the base.

10. The cleaner of claim 9, wherein the housing further includes a second guide protrusion which protrudes in a direction orthogonal to a protrusion direction of the first guide protrusion and guides movements of the upper and lower surfaces of the base.

11. The cleaner of claim 1, further comprising:
at least one gear which is installed in the housing and is rotated by the driving force of the traveling drive motor to rotate the first pulley.

12. The cleaner of claim 11, wherein the at least one gear includes:
a first gear which is coupled to a rotating shaft of the traveling drive motor;
a second gear which meshes with the first gear and is rotated in a direction opposite to a rotation direction of the first gear;
a third gear which meshes with the second gear and is rotated in a direction opposite to the rotation direction of the second gear; and
a fourth gear which meshes with the third gear, is rotated in a direction opposite to the rotation direction of the third gear, and is connected to the first pulley.

13. The cleaner of claim 11, wherein a separation prevention groove into which the belt is inserted is formed on an outer peripheral surface of each of the first pulley and the second pulley,
wherein both side surfaces of the separation prevention groove are parallel to each other, and
wherein the belt maintains a state of being inserted into the separation prevention groove when the clutch disconnects the power between the first pulley and the second pulley.

14. The cleaner of claim 13, wherein in the first pulley and the second pulley, a plurality of locking protrusion are formed on a bottom surface of the separation prevention groove along a circumferential direction, and
a plurality of locking grooves meshing with the plurality of locking protrusions are formed on an inner peripheral surface of the belt.

15. A cleaner comprising:
a cleaner body;
a wheel which movably supports the cleaner body with respect to a floor;
a traveling drive motor which is disposed in the cleaner body;
a first pulley which is rotated by a driving force of the traveling drive motor;
a second pulley which is rotated when the first pulley rotates and rotates the wheel;
a belt which connects the first pulley and the second pulley;
a clutch which adjusts tension of the belt to connect or disconnect power between the first pulley and the second pulley; and
a housing in which the first pulley and the second pulley are rotatably provided,
wherein the clutch includes a base which is installed in the housing so as to be movable linearly, and a tension roller which is rotatably installed in the base and is in contact with the belt to adjust the tension of the belt, and
wherein a hook which is locked to the housing at a position where the tension roller connects the power between the first pulley and the second pulley is formed to protrude in the base.

16. The cleaner of claim 15, wherein the housing includes a rectangular hole and a first guide protrusion which is formed to be elongated in a linear movement direction of the base in an upper side and a lower side of the rectangular hole, and
wherein a guide groove into which the first guide protrusion is inserted is formed on upper and lower surfaces of the base.

17. The cleaner of claim 16, wherein the housing further includes a second guide protrusion which protrudes in a direction orthogonal to a protrusion direction of the first guide protrusion and guides movements of the upper and lower surfaces of the base.

18. The cleaner of claim 15, wherein the hook is formed to protrude in a direction in which the base is linearly moved to connect the power between the first pulley and the second pulley.

19. The cleaner of claim 15, wherein the hook includes:
an upper hook which is formed in an upper portion on one side in the linear movement direction of the base; and
a lower hook which is formed in a lower portion on one side in the linear movement direction of the base.

20. The cleaner of claim 15, wherein a hook protrusion is formed in the hook, and
wherein a locking step to which the hook protrusion is locked is formed in the housing.

21. The cleaner of claim 15, wherein the clutch further includes an elastic member which provides an elastic force for moving the base to an original position when the hook is unlocked from the housing.

22. The cleaner of claim 21, wherein the elastic member is a coil spring,
wherein a first insertion boss inserted into one end of the coil spring is formed to protrude from the base, and
wherein a second insertion boss inserted into the other end of the coil spring is formed to protrude from the housing.

* * * * *